United States Patent [19]

Cole et al.

[11] 4,355,891

[45] Oct. 26, 1982

[54] REDUCTION OF LAMP STROBING EFFECTS IN A REPRODUCING APPARATUS

[75] Inventors: David L. Cole, Fairport; Gregory B. Swistak, Webster; Randall C. Ryon, Fairport; William L. Lama, Webster; Karl A. Northrup, Rochester, all of N.Y.

[73] Assignee: Xerox Corporation, Stamford, Conn.

[21] Appl. No.: 165,177

[22] Filed: Jul. 2, 1980

Related U.S. Application Data

[63] Continuation-in-part of Ser. No. 127,685, Mar. 6, 1980.

[51] Int. Cl.³ ............... G03B 27/34; G03B 27/40; G03B 27/70
[52] U.S. Cl. .................. 355/57; 355/3 R; 355/11; 355/71
[58] Field of Search ............ 355/3 R, 4, 67, 71, 355/11, 57, 51; 362/3, 16, 17, 89, 11

[56] References Cited

U.S. PATENT DOCUMENTS

| | | | |
|---|---|---|---|
| 3,423,153 | 1/1969 | Kent | 355/51 |
| 3,998,539 | 12/1976 | Kidd | 355/4 |
| 4,090,788 | 5/1978 | Massengeil | 355/71 |
| 4,113,373 | 9/1978 | Eppe et al. | 355/71 X |
| 4,113,379 | 9/1978 | Harada et al. | 355/71 |
| 4,226,527 | 10/1980 | Lama | 355/71 |
| 4,248,517 | 2/1981 | Nishikawa | 355/71 X |
| 4,275,960 | 6/1981 | Habegger et al. | 355/71 X |
| 4,305,650 | 12/1981 | Knox | 355/71 X |
| 4,305,650 | 12/1981 | Knox | 355/3 R |

Primary Examiner—Richard A. Wintercorn

[57] ABSTRACT

An optical system is provided for a reproducing machine which scans an object to be reproduced, utilizing a pulsing light source to illuminate successive incremental portions of the object. The ray reflected from the scanned image is directed along an optical path onto the imaging plane. The scanned image is directed onto the imaging plane by a reflector element which has an active slit formed on its surface. The reflector element is positioned an optimum distance from the imaging plane such that the image is defocused at more than one magnification ratio.

17 Claims, 10 Drawing Figures

FIG. 5
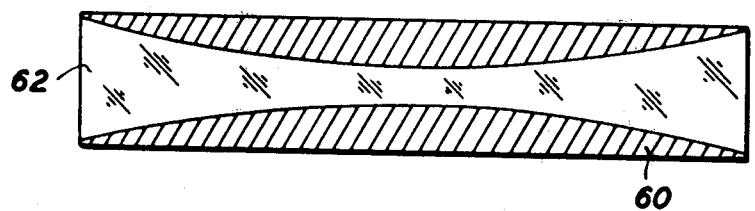
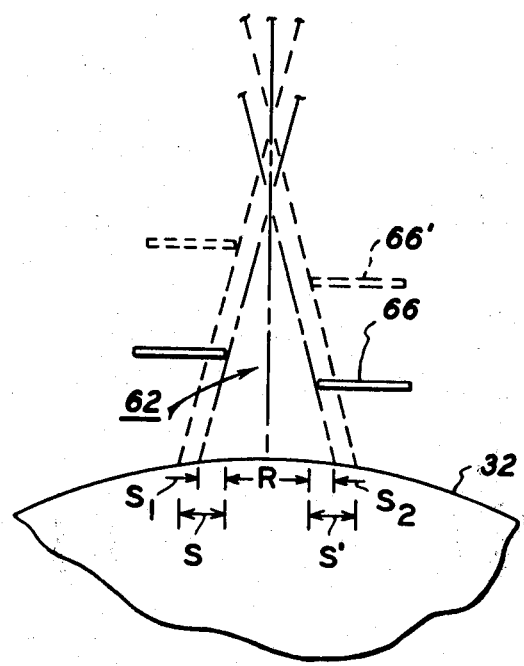
FIG. 6
FIG. 8
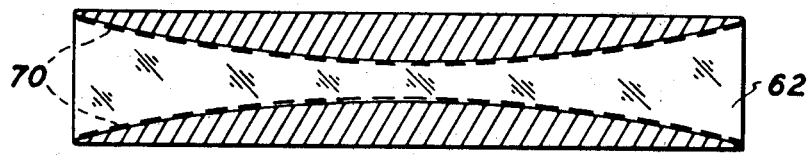

REDUCTION OF LAMP STROBING EFFECTS IN A REPRODUCING APPARATUS

CROSS-REFERENCE TO A RELATED APPLICATION

This application is a continuation-in-part of application Ser. No. 127,685 filed on Mar. 6, 1980.

BACKGROUND AND PRIOR ART STATEMENT

This invention relates to a reproducing apparatus and more particularly to an improved optical scanning system which reduces illumination lamp strobing effects in 1X and reduction modes.

A variety of electrostatographic reproducing machines are in commercial use which copy original documents at a number of magnifications or reductions. In a moving document system, magnification is changed by changing the speed of the moving original and repositioning of the optical elements. In a stationary document system, magnification is effected by changing the speed of the scanning assembly and conjugate changing by repositioning of optical elements. Typically in these machines, an original document on a transparent platen is illuminated by an illumination source. Either the platen or the optical system is adapted to reciprocate in timed relation to the rotation of a photoreceptor drum for scanning the original. A flowing light image of the original is created and projected onto the photoconductor through a light trimming aperture extending across the width of the photoconductor, which may be placed near the photoconductor or near the document.

The illumination source for these machines is generally a fluorescent lamp. These lamps, although appearing to provide a continuous output, actually change from high to low intensity at twice the line frequency rate. As the photoreceptor passes beneath the fixed aperture and is exposed by the projected light image, these cyclic light variations may, depending on factors such as process speed and aperture width, result in a periodic spatial variation in exposure on the photoreceptor in the direction of motion of the photoreceptor beneath the aperture. This exposure variation, or strobing, results in undesirable light and dark lines on subsequently developed copies.

Various prior art techniques have been used to reduce or eliminate strobing effects. In the Xerox 2400 copier, the exposure lamps were operated out of phase by using a lead-lag ballast. A similar effect was obtained in the system described in U.S. Pat. No. 3,998,539. This type of solution added to the cost and complexity of the optical system.

Another method is to move the aperture away from the photoreceptor or platen to defocus the edges of the illumination profile on the photoreceptor thereby eliminating the strobe lines. In a multi-mode system, the aperture would have to be repositioned along the ray path for each magnification change. This may be a feasible solution for some systems.

A still further destrobing method is disclosed in co-pending application Ser. Nos. 963,227 filed on Aug. 3, 1979, now U.S. Pat. No. 4,226,527, issued Oct. 7, 1980 and 094,607 filed on Nov. 12, 1979, now U.S. Pat. No. 4,305,650, issued Dec. 15, 1981. Both applications assigned to the same assignee as that of the present application. In these applications, several types of optical transmission filters are disclosed as being located adjacent the drum aperture. The filters have specified transmission functions which serve to eliminate strobing effects in images projected through the aperture.

SUMMARY

It is the primary object of the present invention to reduce the effects of strobing in a reproducing apparatus. Accordingly, there is provided an illumination system which includes scanning mirror elements cooperating with a movable lens to project images of a document onto a recording surface.

In one embodiment, an exposure slit is formed as an integral pattern on the face of a mirror element, positioned between the lens and recording surface at a distance from the recording surface sufficient to accomplish destrobing over an upper range of magnification values. Destrobing at lower magnification values is accomplished by forming an exposure slit as an integral portion on the face of a second reflector element positioned between the document and the lens. This pattern has edge portions which vary in density in the direction perpendicular to the slit in a prescribed manner. The dimensions of the edge portion are such that the edges of the illumination profile at the photoreceptor have widths equal to integer multiples of the spatial period determined by the optical system's illumination source and process speed.

DRAWINGS

FIG. 1 is a schematic top view of a prior art arrangement of a drum photoreceptor with adjacent aperture slit.

FIG. 2 demonstrates strobing by a lamp having a sinusoidally varying output and showing unequal exposure of two points.

FIG. 3 demonstrates photoreceptor discharge produced by the sinusoidally varying lamp of FIG. 2.

FIG. 5 is a front view of the drum mirror of FIG. 4 illustrating an integral exposure slit.

FIG. 6 illustrates the defocusing effect of moving the active imaging slit away from a photoreceptor surface.

Figure 7:
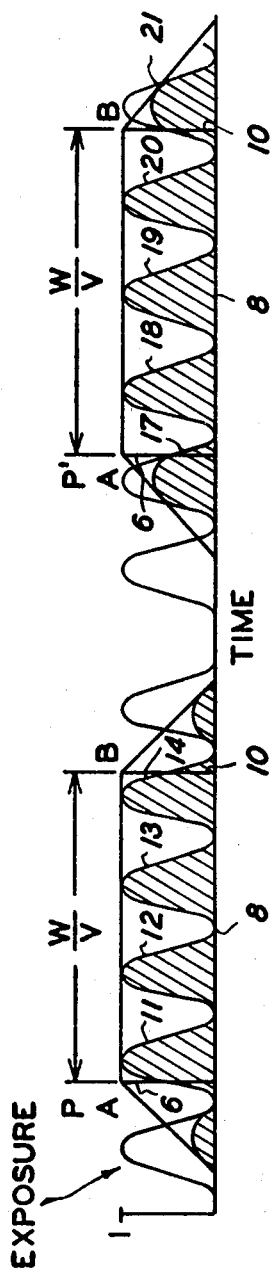

FIG. 7 demonstrates elimination of strobing effects by optimum placing of illumination slit.

FIG. 8 is a front view of the mirror of FIG. 5 showing the projection onto the mirror of a 0.62X ray bundle.

Figure 4:
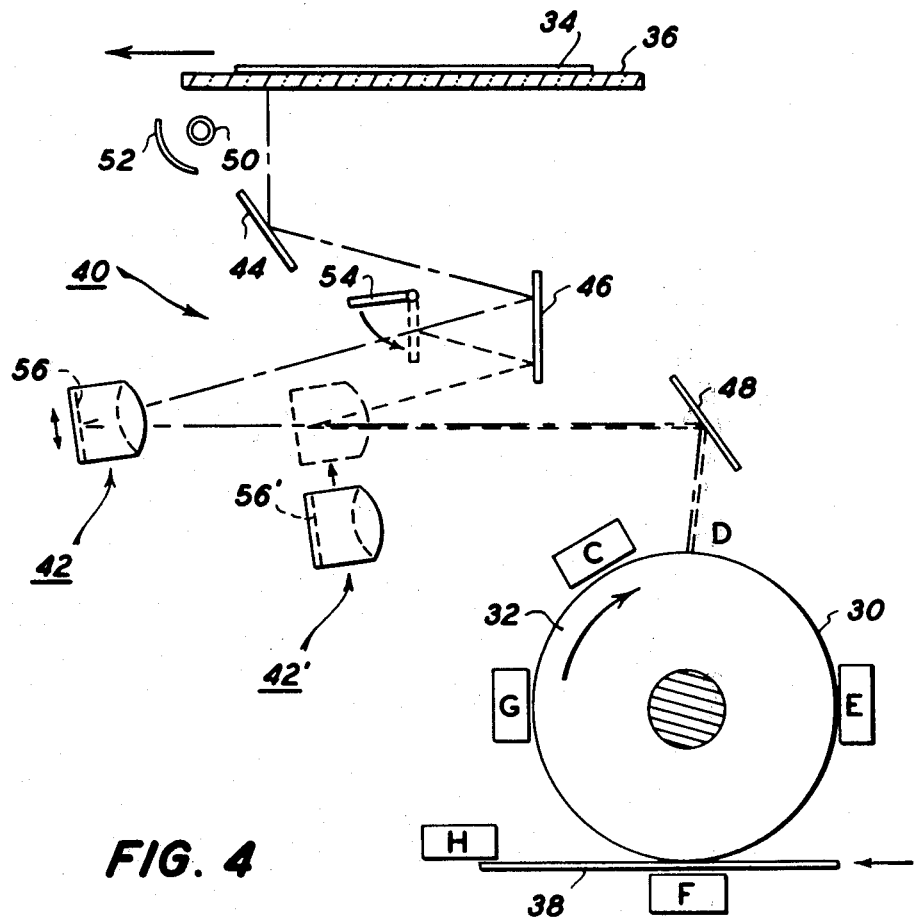
FIG. 4 is a schematic side elevation of an electrophotographic system using the optical system of the present invention.
Figure 9:
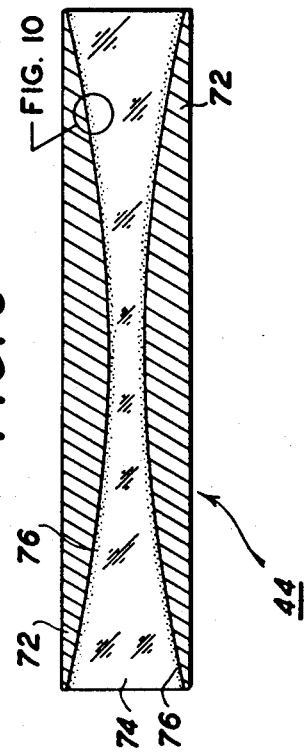

FIG. 9 is a front view of the scanning mirror of FIG. 4 illustrating an integral scanning slit having a defocusing edge pattern formed thereon.

Figure 10:
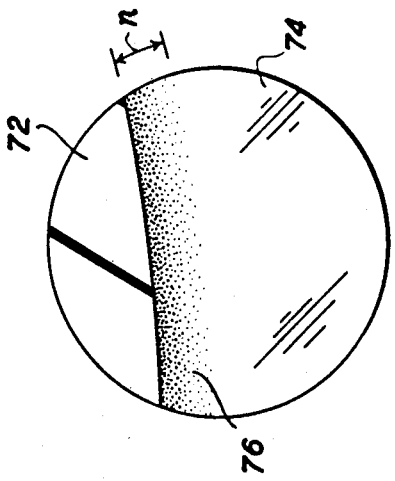

FIG. 10 is a enlarged view of a portion of the edge pattern shown in FIG. 9.

DESCRIPTION

Figure 1:
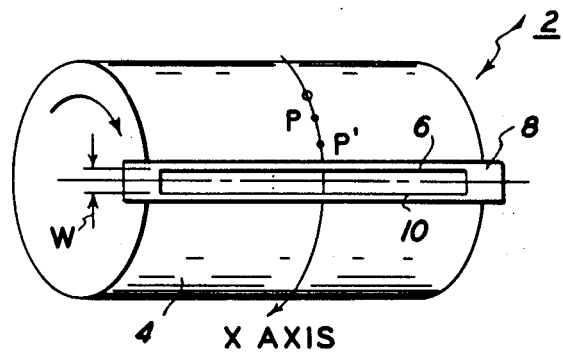
Figure 2:
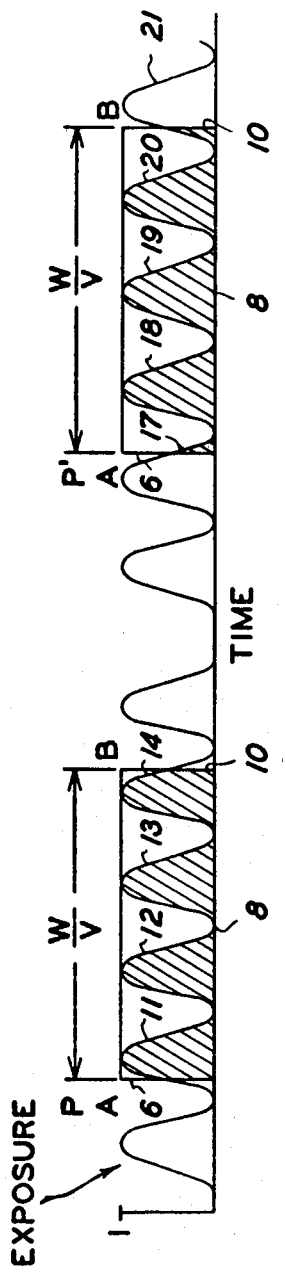
Figure 3:
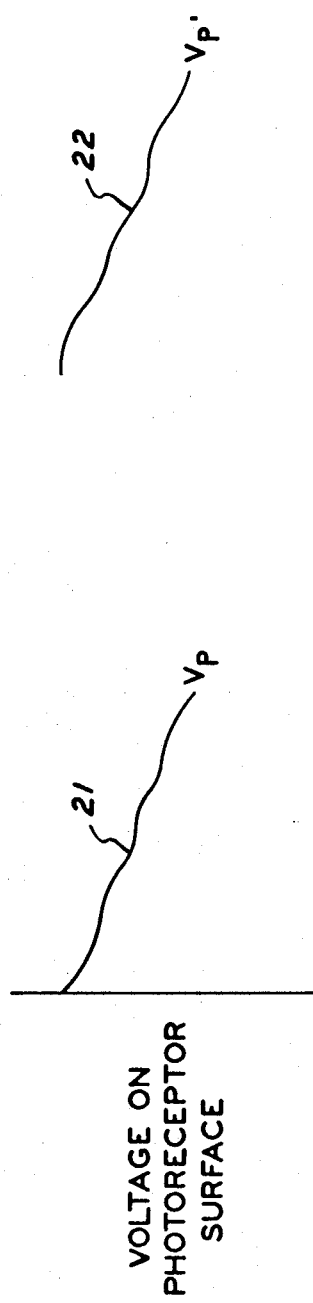

In order to fully appreciate the strobing problems encountered in a relatively high process speed reproducing machine, FIGS. 1-4 and the following description are provided. In FIG. 1, as the photoconductive drum 2 rotates, points on the photosensitive surface 4 revolve about the center axis of the drum. For a short period of time during each revolution, the points traverse from one of the elongated edges 6 of aperture 8 to the oppositely disposed elongated edge 10. Two arbitrary photoreceptor points P and P' located on an X axis perpendicular to the exposure slit are shown in FIG. 1. Assuming the illumination source is a fluorescent lamp, the lamp will not be providing a constant level of intensity but will, in reality, be providing time varying irradiance at twice the frequency of the lamp electrical power supply. Points on photosensitive surface 4 will therefore, receive different total exposures. In other words, with reference to FIG. 1, as points P and P' traverse the window width W, from edge 6 to edge 10, one of the points may receive a greater exposure from the illuminating lamp than the other point and thus, each point will be discharged to unequal voltage levels. This phenomenon is shown in FIGS. 2 and 3. FIG. 2 shows the output of the illumination lamp as a sinusoidal function of time. The two points points P and P' are shown in FIG. 1 traversing from edge 6 to edge 10 of aperture 8 whose width W is assumed to be a constant. The points travel along an axis circumscribing drum photoreceptor surface 4 and parallel to the illustrated X axis. For a given drum velocity V, in a given period of time t, a point on the drum will travel a distance $d = Vt$. Therefore, the window width W divided by drum velocity can be represented in FIG. 2 as covering a given time period which is the exposure time for any point. The point P is shown entering the window just after the start of light pulse 11. Point P receives two more complete light pulses 12, 13, and most of pulse 14 before passing beyond edge 10. Point P', on the other hand, enters the window at the end of light pulse 17 and does not receive a complete light pulse until it has traveled a finite distance into the window. Point P' receives three complete pulses 18, 19, 20 and a small portion of pulse 21 as it emerges from the window. Point P, because of the fortuitous instant of time it entered the window, receives more illumination than point P'. It can be shown, in relative terms, that the exposure for point P is 1.91 and the exposure of point P' is 1.75 or a modulation of 4.444%. The exposure of the two points is proportional to the shaded areas in FIG. 2.

FIG. 3 shows the effects of each exposure pulse on the voltage level of the initially fully charged photoconductor. When the pulse is present, the drum is discharged to a lower voltage level. When the pulse is absent, the voltage level remains constant. The voltage profiles 21 and 22 accordingly, have similar profiles except for the differences at their end. In this case $V_{p'} > V_p$ since P' has been exposed less than P.

From the above, it is evident that there will be lines on the drum parallel to the exposure slit corresponding to the locus of points P and P' and these lines will receive unequal exposures. This results in undesirable light and dark lines (strobing effects) during the development process which are then transferred to the copy sheet.

The strobing effect, however, is accentuated or mitigated, depending upon the type of document being copied and the process speed of the copier. For example, line copy and high density solid areas exhibit less strobing because sensitivity is greatly reduced on these portions of the developability curves. And at slow process speeds (3.45 in/sec) the drum is discharged with more pulses per unit length, each pulse discharging the drum in smaller amounts, again causing reduction in strobing.

On the other hand, documents having background and low density solid areas are relatively more susceptible to strobing. And, as the process speed increases, the lamp intensity must increase and exposure takes place over a shorter distance with greater voltage drops per flash of the exposure lamp, i.e. higher process speeds cause more drastic disturbances in the voltage profile.

An additional factor affecting strobing is the width of the exposure window. If the exposure width W is designed to be an integral number of spatial periods, the strobing is eliminated. (A spatial period is defined as the process speed V divided by the frequency of the illumination source.) Voltage variations take on a worst case when the exposure window is an integral number of spatial periods $\pm \frac{1}{2}$. In reproduction systems wherein an exposure window with a varying width is used, e.g. wider at the ends than in the center, the number of pulses that a photoreceptor sees increases from the center. The result is a series of light and dark bands across the width of the photoreceptor as the strobing takes on worst and best case orientations.

The strobing phenomenon is therefore, seen to exist in lesser or greater degrees depending upon the particular reproducing system in use.

The principles of the invention will be described with reference to the multi-mode xerographic reproducing apparatus shown in FIG. 4, but it should become evident from the following description that the invention is equally well suited for use in a wide variety of reproducing systems requiring a varying light source and is not necessarily limited in its application to the particular system shown herein.

As shown in FIG. 4, an electrostatic charge is placed at station C, uniformly over the photosensitive surface 30 of a moving photoreceptor drum 32, preparatory to receiving the light image of an original 34 placed on a horizontal transparent platen 36. The charged surface 30 is moved through exposure station D in the direction of rotation and a flowing light image of the original 34 is recorded on the surface 30. Next, the image bearing surface 30 is transported through a development station E for application of toner material to the charged surface rendering the latent electrostatic image visible. The developed image is brought into contact with a sheet of final support material 38 within a transfer station F and the toner image is electrostatically attracted from the surface 30 to the contacting side of the support sheet. Any residual toner particles remaining on the surface 30 after the completion of the transfer operation are removed within a cleaning station G, placing the surface in a condition to repeat the process. After the transfer operation, the image bearing support sheet is forwarded to a fusing station H via a suitable conveyor.

The optical scanning system shown in FIG. 4 is similar to that disclosed in U.S. Pat. Nos. 4,057,342 and 4,029,409 whose contents are hereby incorporated by reference. Optical system 40 is stationary and platen 36 is mounted for movement relative to system 30 by suitable driving means. The optical system at unity magnification consists of a lens 42 positioned below the platen, a pair of mirrors 44 and 46 and a drum mirror 48. Mounted beneath the platen is lamp 50 with associated reflector 52. The lamp and reflector serve to illuminate a longitudinally extending area or strip upon platen 36 within the viewing domain of mirror 44. The lens 42 is basically a half-lens objective having a reflecting surface at the stop position to simulate a full lens system.

For a reduction mode of operation, the optical system is modified to provide for an alternative lens 42' which is translated to an operative position as lens 42 is translated to a stored position and for the insertion of an add mirror 54 into the optical path to change the platen to lens conjugate.

In operation during a 1× mode, document 34 is moved to the left as indicated by the arrow, and at a rate of travel synchronized to the peripheral speed of drum 32. An image of each incremental area viewed by mirror 44 is reflected toward mirror 46, which, in turn, reflects the image back to lens 42. The lens reflecting surface 56 positioned at the lens stop position, reverses the entering light image and redirects the light rays towards mirror 48 positioned above the drum surface. Mirror 48, in a manner to be more fully described below, reflects the projected image onto surface 30 creating a flowing light image of the original document thereon.

In a reduction mode of operation, document 34 is advanced past the optical system at an increased velocity relative to the drum 32. Alternate lens 42' and mirror 54 are moved into their operative positions. Lens 42' having a different focal length accomplishes the required change of conjugate distance between the lens and the image plane, while mirror 54, in cooperation with mirror 46 adjusts the conjugate relationship on the object side of the lens. For purposes of discussion, it will be assumed that two reduction modes are employed; 0.72× and 0.62×. The optical system discussed thus far is, in general, disclosed in the forementioned U.S. Pat. Nos. 4,057,342 and 4,029,409. According to the principles of the present invention, the optical system has been modified in order to accomplish the purpose of reducing the strobing effects caused by fluorescent lamp 50 at all magnifications. These modifications have been directed to mirrors 44 and 48 and, more particularly, to the formation of reflectance patterns thereon which have the effect of trimming and/or defocusing the illumination profiles reflected therefrom at different magnifications.

Discussing, firstly, mirror 48, the mirror has been modified to perform other functions in addition to the known use which has hitherto been simply to reflect the projected image onto a photoreceptor surface through an aperture or slit located near the drum surface. Implicit in the above description is the fact that there is no active slit or aperture located adjacent the drum. The trimming function formerly performed by this slit is now accomplished at the mirror 48 surface by means of a reflective pattern formed on the mirror surface. As shown in FIG. 5, the surface of mirror 48 is seen to consist of non-reflective portions 60 and a reflective portion 62 contoured to compensate for illumination falloff due to $\cos^4$ lens falloff, lamp output distribution and lens aberration, by using the conventional butterfly slit boundary profile. The slit mirror pattern can be formed using the principles disclosed in U.S. Pat. No. 4,076,416 assigned to the same assignee as the present invention.

From the above discussion it is appreciated that this type of butterfly profile could be subject to undesirable strobing effects. It is evident that the illumination profile falling upon the surface of mirror 48 will be trimmed and shaped by reflective portion 62 prior to reflection onto the photoreceptor surface. With the mirror 48 now acting as the active slit, it becomes possible to consider a solution to the strobing problem which would extend over a significant magnification range. This solution entails locating mirror 48 at an optimum distance from the drum surface where the light reflected from the upper and lower boundaries of the slit is defocused to some extent on the photoreceptor. The significance of this can best be appreciated in the reference to FIG. 6.

Slit 62, for purposes of this analysis, represents tilted mirror 48. As shown in the Figure, if slit 62 is located at position 66 relative to drum 32, the light reflected onto the drum surface consists of direct light component R and defocused components $S_1$, $S_2$. When slit 62 is moved to position 66', it is seen that the defocused areas S, S' are larger than the areas $S_1$, $S_2$. The defocused area continues to increase with increasing distance from the photoreceptor. Defocusing of the light passing through the slit has the effect of distributing the first and last flashes of a cyclic light source such as shown in FIG. 2 over the defocused areas. As shown in FIG. 7, the shaded areas, again proportional to exposure have been made equal for both points, completely eliminating modulation. Stated alternatively, the final discharge potential produced by the illumination lamp is made constant for all points on the photoreceptor by reducing its intensity during the first and final flashes across the slit as viewed by the photoreceptor surface.

For any given magnification, there is a optimum defocusing widths, each of which is equal to an integral number of spatial lamp periods. While this is an acceptable solution for a single mode such as unity magnification, it would not be workable at other magnifications without moving the slit to other positions along the ray path, a movement which would add undue complexity to the system. According to one aspect of the invention, mirror 48 is positioned in a location which places effective slit 66 intermediate the optimum points for a range of magnifications between 1.01× and 0.72×. It has been found that strobing effects, for the system shown, are reduced to acceptable (i.e. strobing not evident) limits by use of this expedient. For the system shown in FIG. 4, assuming an f/5 lens, focal length of 7.5", drum velocity of 5.8 inches/sec, and lamp frequency of 120 Hz, a single spatial period would be 0.048" and two periods would be 0.096". The optimum defocus points for 1.01× and 0.72× reduction modes would be respectively, 0.902" and 0.819" above the photoreceptor.

When operating in reduction modes below this range, however, and particularly, in the 0.62× reduction mode, the illumination profile is reduced in dimension relative to the larger 0.72× and 1.01× profiles as it encounters mirror 48. As shown more clearly in FIG. 8, the 0.62× profile indicated by dotted line 70 passes within the center of slit 62 and hence is not subject to the defocusing phenomenon described in relation to the other two modes. Defocusing of the 0.62× profile is achieved, according to another aspect of the invention by forming a slit pattern on mirror 44 as shown in FIGS. 9 and 10. As shown in the figures, the surface of mirror 44 consists of non-reflective portions 72, a reflective portion 74 forming a passive slit and graded halftone edges 76. A graded halftone edge 76, shown in the enlarged detail in FIG. 10 is a series of dots that have been silk screened (67 line screen) onto the surface and which preferably vary linearly from 0 to 100% area coverage over a distance h along the edges of tapered passive slit 74. The width n in FIG. 10 of each edge 76 is selected to equal two spatial defocusing periods of the lamp when projected onto the drum. For the embodiment shown, the dots were formed to be 0.005" in diameter and distance n was 0.075". The dot variations may depart somewhat from the preferred linearity and still accomplish satisfactory defocusing.

Reviewing the operation of the mirrors 44 and 48 in the different modes, in a 1.01×, 0.72× and 0.62× modes passive slit 74 reflects initially identically shaped ray bundles which are projected by lens 42 or 42' onto mirror 48. Because of the different lens positioning, the 1.01× or 0.72× ray bundles are large relative to the 0.62× bundles. Their edges are, therefore, trimmed out by the edges of active slit 62 and the new edges are defocused as they are projected onto the photoreceptor. The 0.62× ray bundles, reduced in size fall completely within slit 62 and would, therefore, not ordinarily be subject to the defocusing effect of the optimum slit positioning. However, due to dot pattern 76, this ray bundle arrives at mirror 48 with the desired defocused edges already formed. This pre-defocused image is then projected onto the photoreceptor surface.

Various alternate embodiments of the scanning system are possible consistent with the features of the present invention. Although the dot pattern for the 0.62× reduction mode is shown on mirror 44, it could also be formed on add mirror 54 as other mirrors in a more complex folded system. And, while the active slit 62 of mirror 48 provided sufficient defocusing for the system shown, it might be necessary to achieve even further defocusing and this could be done by forming the half-tone dot pattern on mirror 48 in the same manner as for mirror 46.

While the preferred implementation shows the active slit formed on the drum mirror, the invention may still be usefully practiced in a system which has a separate active slit located adjacent the drum. The projected image passing through the active slit may be defocused by forming a passive slit with half-tone edges on any of the mirrors preceding and/or including the drum mirror. And while the system has been shown to have two discrete reduction modes, it could be adapted, by one skilled in the art, to cover a continuous range of reductions or enlargements. As a further point, certain reproducing systems may not require $\cos^4$ compensation; hence slit 62 may be rectangular. It is understood the invention as disclosed herein could also be adapted for use in this type of system.

Finally, while the preferred embodiment of FIG. 5 shows a stationary optical system, the optics could be made movable so that mirrors 44 and 48 move in operative fashion to scan a stationary document.

To summarize the advantages of the invention, reduction of strobing effects in a reproducing machine has been effected by the simple and inexpensive patterns on the mirror which form part of the imaging system. The requirements for a variable position drum aperture, and indeed for the aperture per se, have been eliminated.

We claim:

1. In an apparatus including an optical system for strip-wise viewing a document to be reproduced and for projecting an image thereof onto a recording surface, said optical system having a process speed V and including a light source having a fundamental frequency $f_o$ which illuminates the document and at least one reflector element having an elongated illumination slit integral with said reflector, said reflector element located at a distance from said recording surface, such that the strobing effects of said light source on said recording surface are minimized.

2. The apparatus of claim 1 wherein said optical system includes means for changing the magnification of said projected image, said reflector element being located at an optimum distance from said recording surface such that the strobing effects of said light source are minimized at a plurality of magnifications.

3. The apparatus of claim 2 wherein said magnification range is from 1.01× to 0.72×.

4. The apparatus of claims 2 or 3 wherein said reflector element is positioned such that the image projected onto the recording surface comprises an elongated, brightly illuminated, central portion and top and bottom portions which become increasingly defocused with distance from the center, said defocused portions having a width approximately equal to an integral number of spatial periods of said light source.

5. Apparatus for optically scanning a document in an object plane and creating a flowing light image thereof on a recording surface at a process speed V including:
a light source having a fundamental frequency $f_o$ which illuminates said document,
optical means for projecting the image to be copied along an optical path onto said recording surface,
means for changing the magnification of the image projected onto said recording surface,
said optical means including at least one reflector element which has an illumination defining slit pattern integrally formed on its surface, said pattern generally comprising a reflective central portion and top and bottom edge portions which generally increase in density with increasing distance from said central portions, said slit pattern reducing the strobing effects of said light source for at least one of said magnifications.

6. Apparatus as claimed in claim 5 wherein said reflector element is disposed to scan successive incremental areas of the original and reflect said incremented areas along an optical path to a projection lens positioned to transmit the images reflected by said reflector element, said optical means further including a second reflector element positioned to reflect the document images transmitted by said projection lens to the recording medium through an image defining aperture slit.

7. Apparatus as claimed in claim 6 wherein said image defining aperture slit is integrally formed on the surface of said second reflector.

8. Apparatus as claimed in claim 7 wherein said second reflector is positioned at a distance from said recording medium such that images transmitted at magnifications ranging from 1.01× to 0.72× are trimmed and reflected onto said recording surface as an elongated, illuminated strip having a central, uniformly illuminated portion and edge portions which generally decrease in illumination with increasing distance from said central portion, thereby resulting in an edge defocused recorded image which minimizes the strobing effects of the light source.

9. Apparatus as claimed in claim 8 wherein images transmitted in 0.62× reduction are defocused at said first reflector and are reflected by said second reflector without trimming action, onto the recording surface.

10. Apparatus as claimed in claim 8 wherein said edge portions have a height which is approximately equal to an integral number of spatial periods of said light source when projected onto said recording surface.

11. An optical system for projecting an image of an object from an object plane to an image plane, including the following disposed along an optical path:
support means to support an object at said object plane,
a light source having a fundamental frequency $f_o$ which illuminates the document,
a projection lens, photosensitive means disposed at said image plane to receive an image of an object, first and second reflectors between said object plane and said projection lens to fold said optical path, said first and second reflectors being disposed for scanning of said object, said support means being movable in said object plane so as to move an object for scanning of said object relative to said reflectors, a third reflector selectively positionable into and out of said optical path to form with one of said reflectors a reflection cavity to change said object conjugate distance, a first lens positionable in said optical path in a unity magnification mode, a second lens selectively positionable into and out of said optical path and disposed for movement relative to said optical path to change conjugate distance, and laterally of said optical path to remain centered thereon, said second lens providing a magnification change in the range of 0.72× to 0.62×, a fourth reflector positioned to reflect the document images transmitted by said first or second lens to the recording medium, said first reflector having a slit profile pattern integrally formed which defines an opening for the passage of image rays therethrough which is wider at the ends of said slit than in the middle thereof, said pattern comprising a reflective central portion and top and bottom edge portions which generally increase in density with increasing distance from said central portions, and said second reflector having a slit profile pattern integrally formed thereon which defines an opening for the passage of image rays therethrough which is wider at the ends of said slit than in the middle thereof.

12. The optical system of claim 11 wherein said edge patterns are formed on said first reflector as a series of dot half-tone patterns which increase in density from 0 to 100%, each pattern having a vertical dimension producing a defocused area on the photoreceptor having a width approximately equal to two spatial periods of said light source.

13. The optical system of claims 11 or 12 wherein said fourth reflector is positioned at an optimum distance from said image plane such that light ray bundles at magnification of 1.01× to 0.72× passing through said integrally formed slit are edge trimmed and form an image whose edges are defocused to reduce strobing effects of said light source.

14. The optical system of claim 13 wherein light ray bundles of an image projected at 0.62× magnification are defocused by action of the dot pattern on said first mirror and are reflected completely within the fourth mirror slit onto the image plane.

15. The optical system of claim 11 or 12 wherein said fourth reflector has an edge pattern generally similar to that formed on said first mirror.

16. The optical system of claim 11 wherein the slit pattern on said first and second reflectors is formed by silk-screening techniques.

17. A machine having a document supported for illumination, a light source illuminating the document, and having a fundamental frequency $f_o$, an first reflector means for strip-wise scanning of said document, a projection lens having diameter D and focal length F, for projecting said scanned image along an optical path, where lens f number = f/D a photoreceptor moving at a predetermined speed v, a second reflector having a longitudinal imaging slit formed integrally on said reflector surface, said second reflector positioned a distance h from said photoreceptor, said distance being an optimum defocusing position from said photoreceptor to reduce strobing effect of said light source wherein $$h = \left(\frac{v}{f_o}\right)\left[\frac{F(1+m)}{D+v/f_o}\right]$$

* * * * *